March 30, 1948. H. F. ROST ET AL 2,438,576
DEVICE FOR LOCATING AND FOLLOWING OF OBJECTS
Filed Oct. 30, 1944 3 Sheets-Sheet 2

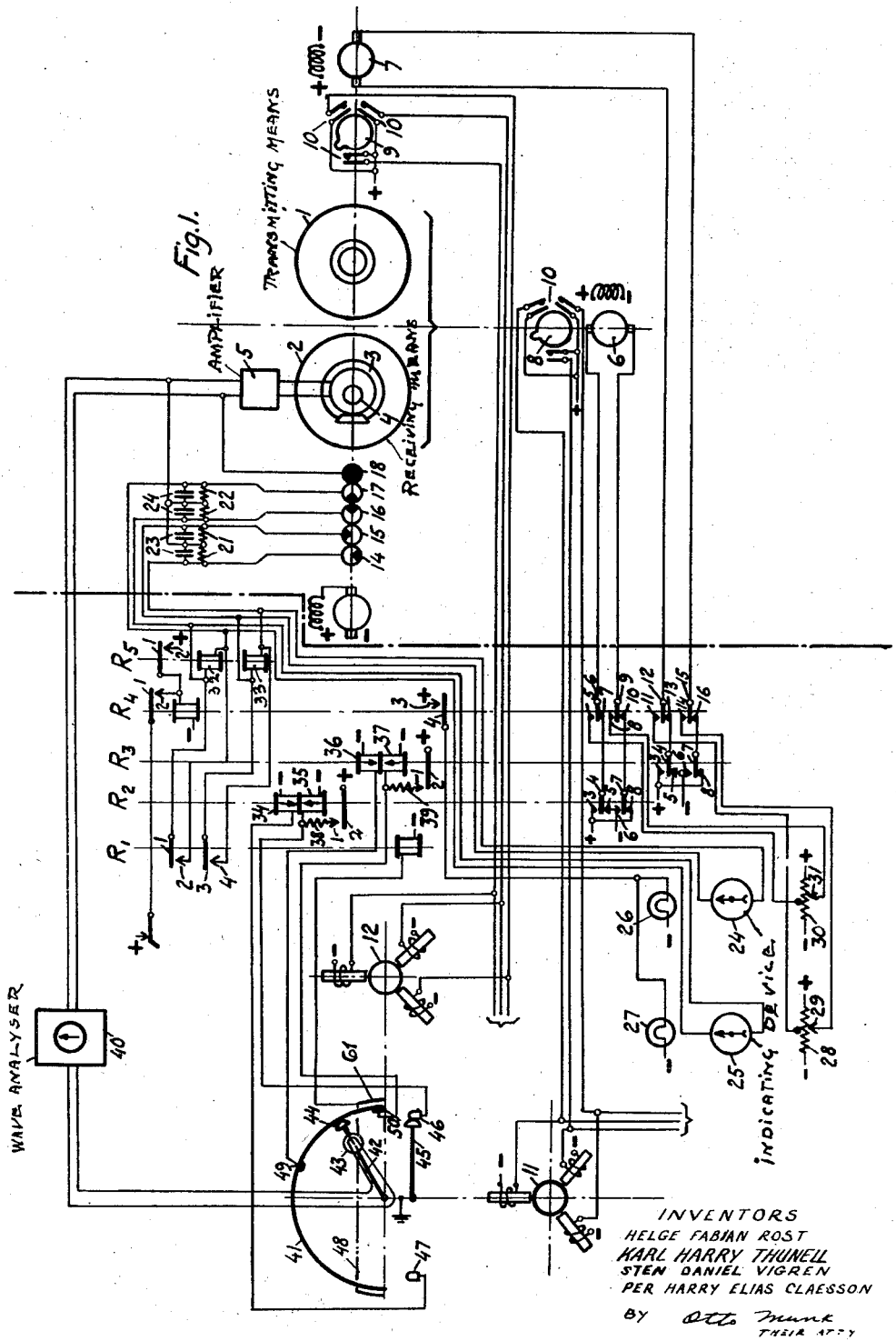

INVENTORS
Helge Fabian Rost
KARL HARRY THUNELL
Sten Daniel Vigren
Per Harry Elias Claesson
By Otto Munk
their ATTY.

March 30, 1948.  H. F. ROST ET AL  2,438,576
DEVICE FOR LOCATING AND FOLLOWING OF OBJECTS
Filed Oct. 30, 1944  3 Sheets-Sheet 3
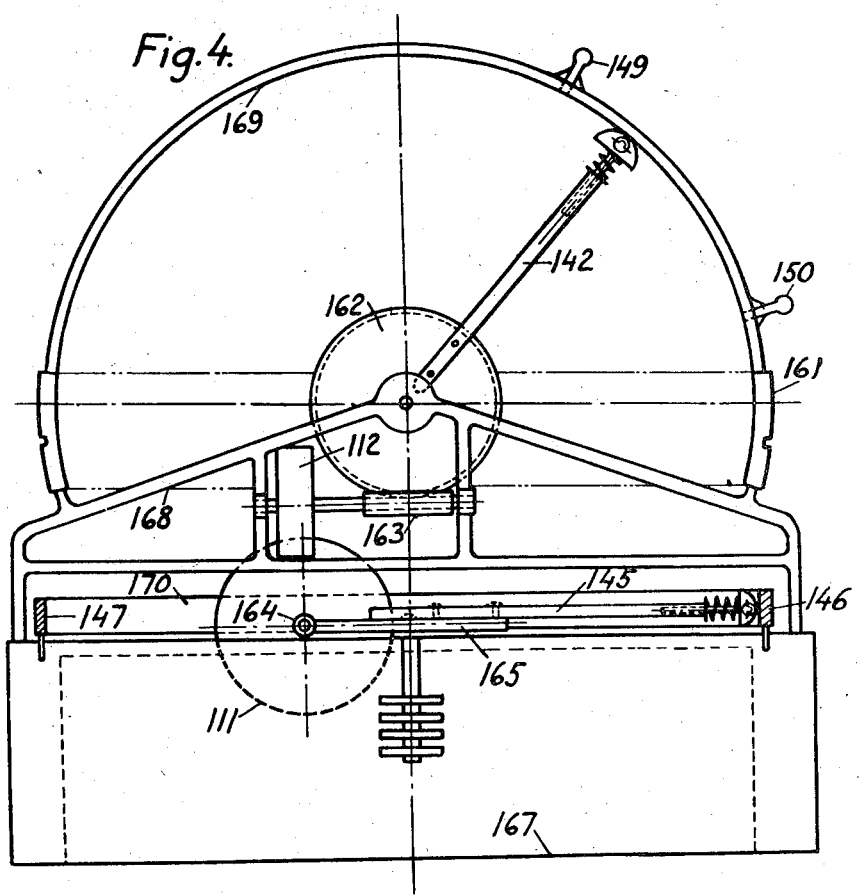
INVENTORS
HELGE FABIAN ROST
KARL HARRY THUNELL
STEN DANIEL VIGREN
PER HARRY ELIAS CLAESSON
BY *[signature]*
THEIR ATTY Patented Mar. 30, 1948

2,438,576

UNITED STATES PATENT OFFICE 2,438,576

DEVICE FOR LOCATING AND FOLLOWING OF OBJECTS

Helge Fabian Rost, Djursholm, Karl Harry Thunell, Nockeby, Sten Daniel Vigren, Stockholm, and Per Harry Elias Claesson, Jakobsberg, Sweden Application October 30, 1944, Serial No. 561,004 In Sweden February 2, 1943

7 Claims. (Cl. 343—7)

1

The present invention relates to an improved device for locating and following of fixed or movable objects in space by means of directed ultra-short radio waves.

The present invention is a continuation-in-part of our copending patent application Ser. No. 377,344, filed February 4, 1941, Patent No. 2,409,448, granted October 15, 1946.

Said patent application refers to a device for locating and following objects in space by means of rotatable transmitting and receiving means pointing in substantially the same direction for the transmission and the reception of directed radio waves reflected from said objects, in which driving means are provided and adapted to rotate the transmitting and receiving means in at least one plane, impulse transmitting means coupled to said driving means and adapted automatically to transmit electric impulses to said driving means to turn said transmitting and receiving means in predetermined compulsory paths in at least one plane in order systematically to locate an object in space, and controlling means coupled to said receiving means and adapted successively to transfer amounts of energy from two opposite directions of a certain plane within a limited field of seeking to said driving means for driving in one or the other direction, and a switching device coupled to said controlling means and adapted to disconnect said impulse transmitting means from said driving means and to couple said controlling means to said driving means for controlled driving and following of an object at the moment when an amount of reflected energy has been received in the receiving means.

According to an embodiment of the said previous specification the invention referred to a system for the same purpose, in which there were provided an electromagnetic operating or contact making device, amplifying and distributing means coupled to said receiving means and to said electromagnetic operating device and adapted to transfer radio energy to the latter, said electromagnetic operating device being adapted to control said driving means, and being controlled in its movements by said amplifying and distributing means, whereby said switching device is coupled to said electromagnetic operating device, said switching device being adapted to disconnect said impulse transmitting means from said driving means, said electromagnetic operating device actuating said switch at the moment when reflected energy from a located object is received in the receiving means in order to disconnect said directing means from said driving

2 means and establish control over said driving means for following said object in accordance with the movements of said electromagnetic operating device, said amplifying and distributing means serving successively to receive and amplify amounts of radio energy from two somewhat diverging directions in the same plane corresponding to equal parts of the field of search, and to transfer two such successively received amounts of radio energy and deliver the resulting energy difference, if any, to said electromagnetic oprating device, in order to indicate and follow the movement of said object in space in one direction or the other in the respective plane, depending upon which amount of energy is the greater.

The present invention relates to an improved similar system for locating and following objects in space, said system comprising rotatable transmitting and receiving means pointing in substantially the same direction for the transmission and the reception of directed radio waves reflected from the object, driving means for rotating said transmitting and receiving means in at least one plane, impulse transmitting means coupled to said driving means for automatically turning said transmitting and receiving means in predetermined paths for searching said object in space, a current direction sensitive indicating device comprising a movable index and a scale for indicating departure of said index from its zero position, amplifying and distributing means coupled on one side to said receiving means and on the other side to said current direction sensitive indicating device for successively receiving and amplifying amounts of radio energy from two somewhat diverging directions in the same plane and corresponding to equal parts of the searching field and for transferring two successively received amounts of energy and delivering the resulting energy difference, if any, to said indicating device, manually operable electric means associated with said current direction sensitive indicating device and coupled to said driving means for turning said transmitting and receiving means in such a direction that the movable index of said current direction sensitive indicating device returns or stays in zero position, in order to obtain a continuous indication of movement of an object in space corresponding to the instant position of the transmitting and receiving means, a switching device coupled between said driving means on one side and said manually operable electric means and said impulse transmitting means on the other side for disconnecting said impulse transmitting means from said driving means at the moment, when reflected energy is received from an object in space by the receiving means, and for connecting said driving means with said manually operable electric means for the operation of said driving means in one or the other direction in accordance with the movement of said index in one or the other direction from its zero position.

According to an embodiment of the invention the system is provided with a potentiometer device comprising a manually operable contact for varying the speed of the electrically driven motor, in order rapidly to adjust the direction of the transmitter and the receiver in the direction of an already located object for continuous following of same.

According to another embodiment of the invention the system comprises an object direction indicating device, which comprises a circular or semispherical shell, which preferably is made of transparent material, and an indicating contact arm, which by synchronous drive is synchronously driven with the transmitter and the receiver. The arm is provided with visible indicating means, for example, a lamp attached to said contact arm and arranged to flash or light when a reflected wave is received in the receiver. Thus the lamp or the arm indicates the approximate position of the object in space, which is of importance, for example, to a battery commander for general orientation.

According to still another embodiment of the invention the system comprises adjustable end position electrical contacts, located and arranged on said ring- or spherically shaped, preferably transparent, surface or shell, and a contact arm synchronously driven with the said transmission and receiving means, and which contact arm is arranged to make contact with said removable end contacts, which can be placed in any desired position on said shell to facilitate searching any desired sector of sky or space.

By means of so-called shading contact devices located on the surface of said shell such contacts can be used for short-circuiting the indicating device, when radio energy is reflected within a certain sector by low objects, for example churches, trees and the like, for which objects no indication is desired.

The invention will be further understood from the following description in connection with the accompanying drawings, of which:

Fig. 1 is a diagram showing the general principle of the invention.

Fig. 4 shows another embodiment of the direction indicating means shown in Fig. 2.

Figures 2, 3:
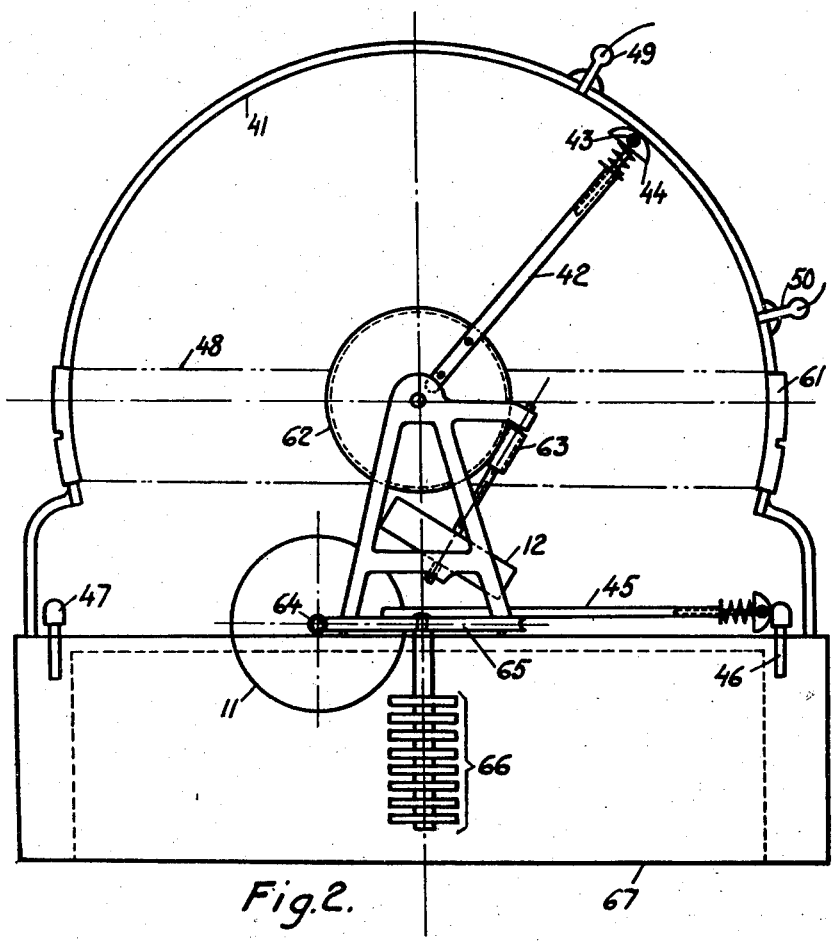
Fig. 2 shows a mechanical embodiment of a spherical shell with contact arms for directing the driving means, when searching for an object in a certain sector of the sky.
Fig. 3 shows a detail of the embodiment shown in Fig. 2.

In Figs. 1–3 1 represents an ultrashort radio wave transmitter with its reflector. An ultrashort radio wave receiver with its reflector 2 and diaphragm 3 with excentric hole 4 and rotatable by means of a gear driven by a motor 13, is driven together with the transmitter in the horizontal plane by a motor 6 and in the vertical plane by a motor 7. Contact arms 42 and 45 associated with shell 41 are synchronously driven with the transmission and receiving means by means of motors 11 and 12, which obtain impulses from contact sets 10 and cam wheels 8 and 9, which in known manner are arranged on the shafts of motors 6 and 7. The contact arm 45 can move many times to and fro, while the contact arm 42 once moves up or down, due to the fact that the motor 11, which drives arm 45, can turn many times faster than the motor 12, which drives arm 42.

The movement of contact arm 42 in a vertical direction is controlled by the contacts 49 and 50 movable on the spherical surface 41 within the desired sector. The movement of contact arm 45 in horizontal direction is controlled by contacts 46 and 47. When contact arm 42 with its contact 44 is moved downwards, it momentarily makes contact with the fixed contact 50. A circuit is thereby closed: Plus pole of current source via arm 42, contact 44, contact 50, winding 37 of relay R3, minus pole of current source. Relay R3 operates its armature and receives holding current over its winding 37 and contacts 1—2, resistance 39, contact 50, contact arm 42 and the current source plus pole. The motor 7 which was previously rotating in a certain direction and then obtained current over the pole changing contacts 4—5 and 7—8 of relay R3 changes its direction when relay R3 operates its armature, because the direction of current then changes, and the motor 7 thereafter receives current over contacts 3—4 and 6—7 of relay R3. When the motor 7 changes direction, the arm 42 driven by a motor 12 driven synchroneously with motor 7, will also change direction, and the arm moves upwards, until it encounters the upper contact 49. The following circuit will then be established: Plus pole of current source, winding 36 of relay R3, which is counteracting winding 37, so that their electromagnetic fields are neutralized, and the relay armature is deenergized.

The pole changing contacts of the relay R3 are again changed and the motor 7 receives current in opposite direction, so that it again changes direction. In said manner the contact arm 42 and its contact 44 are continuously moved up and down.

The arm 45, however, is simultaneously turned in horizontal direction by means of a motor 11, synchronously driven with the transmitting and receiving means and their motor 6 for horizontal rotation in a similar manner to that above described for the vertical movement. Relay R2 thereby serves as controller of the movement between contacts 46 and 47 in the same manner as relay R3 for the vertical movement, and which contacts are adjustable in order to limit the horizontal searching movement.

It will be understood that since the arm 42 moves only a short distance for each to and fro movement of the arm 45, the contact 44 will be able to make contact with contacts 49 and 50, when the arm 45 is in the position shown in Fig. 2.

The contact discs 14—18 are rotated by the motor 13, which by a conical gear coupling simultaneously turns the diaphragm 3 with its excentrically located aperture 4 for the passage of received reflected wave energy from different and preferably oppositely located, slightly diverging directions of a limited field of search. Received wave energy after rectification, for example, in the amplifier 5, is conducted during periods of rotation of a quarter of a turn of the diaphragm to potentiometers 21 and 22 and condensers 23 and 24 respectively. The condensers 23 are connected to a current direction sensitive instrument 24 and to a winding of relay R5, while condensers 24 are connected to another current direction sensitive instrument 25 and to another winding of the relay R5.

R4 is a relay auxiliary to relay R5 for the object of disconnecting motors 6 and 7 from the compulsory search operation controlled by the pole changing relays R2 and R3.

R1 is intended to shortcircuit the windings of relay R5, when the transmitter and the receiver are directed towards objects protruding at the horizon, for example, a church, a large building, trees, forest and the like. This shortcircuiting action takes place, when the arm 42 is located within zone 48 of the spherical surface 41 while making contact with metallic strips 61, which are movable up and down in guiding tracks arranged on the surface 41.

When the contact 44 makes contact with such a metallic strip 61, which is exactly located in the direction of the obstacle, relay R1 is operated according to the following circuit: Plus pole of current source, contact arm 42, contact 44, strips 61, winding of relay R1, minus pole of current source.

Between a wave transmitted by the transmitter 1 and a reflected wave received by the receiver 2 a beat frequency is formed in known manner and passed through an amplifier 5 and a wave analyser 40. The wave analyser is arranged in known manner to deliver a direct current potential or a current proportional to the said beat frequency.

The output side of said wave analyser is coupled to an incandescent lamp or other similar device, 43, located on the contact arm 42. When a beat frequency is formed upon the receipt of a reflected wave, said lamp or device is lighted with an intensity approximately corresponding to the frequency of the said beat frequency. As the contact arm at such a moment indicates the exact direction, in which an object is found, an observer can get a fair indication of the direction as well as of the approximate distance to the object.

The indicators 24 and 25 are also provided with incandescent lamps 26 and 27 to indicate when reflected energy is being received. When reflected energy is received, relay R4 interrupts the compulsory search, and manual following of the object is started, the operator can drive the motor 6 in one or the other direction by moving contact 31 of the potentiometer 30 to the right or to the left, until index of the galvanometer 24 indicates zero position, in which case the motor 6 stops, and the transmitter and the receiver are directed in a vertical plane passing through the object.

In the same manner contact 29 of potentiometer 28 can be operated to actuate the motor 7 for rotating the transmitter and the receiver in a vertical plane, until they are directed towards the object.

The indication of the wave analyser is then simultaneously observed for indication of the exact distance to the object, and all observed data, such as side and elevation angles, distance, etc. are communicated in known manner to a central instrument or directly to the guns of a battery.

When searching for an object in space, the transmitter and the receiver are arranged to be continuously moved in certain predetermined paths, and the receiver is provided with directing means arranged successively to receive reflected radiant energy in two directions, slightly diverging from each other, from two equal parts of a total field of search. If an object is located in one or both of these parts of a field of search, the directing means directs reflected energy from said object to the receiver.

The present embodiment of the invention shows a single receiver, for example a dipole, a Klystron or the like, which can receive radio energy, if the diaphragm 3 screens the received radio waves in such manner that only part of the total energy of the momentary direction is at a certain moment allowed to pass to the dipole or to the Klystron. By means of distributing means 14—15 amounts of energy from two directions in the same plane are alternatingly allowed to pass to the dipole or to the Klystron, which energy amounts are rectified and thereafter counter-directed so that for example the condensers 23 receive counter directed potentials. The resulting potential difference is transferred to the indicating means 24, which thereby indicates, if the object is located more or less on one side or the other of a center plane between the two diverging searching directions.

In Fig. 2 motor 11 drives the contact arm 45 by means of gear 64—65, while motor 12 drives contact arm 42 by means of gear 62—63. The gears can be so dimensioned that while the arm 42 slowly moves, for example, from the upper contact 49 to the lower contact 50, the arm 45 is horizontally moved a great many times between the corresponding latitude positions of contacts 46 and 47, so that the entire sector will systematically be searched in a manner similar to that of television. By means of contact rings 66 electric connection is obtained with other parts shown in Fig. 1. The direction means is mounted on a platform 67.

In Fig. 3 is shown a sector of the spherical embodiment of the indicating means shown in Figs. 1 and 2, and where metal strips 61 in tracks within zone 48 can be moved up or down for screening or shadowing of a certain field of search.

In Fig. 4, which is a modification of the direction indicating means shown in Fig. 2 for patrolling a certain section of the sky, a motor 111 drives a contact arm 145 in a horizontal plane by means of gear 164—165, while a motor 112 attached to a frame 168 drives contact arm 142 in a vertical plane by means of gear 162—163.

The frame 168 is fixed to a common platform 167. The gears can be so dimensioned that while the arm 142 slowly moves, for example from the upper contact 149 to the lower contact 150, the arm 145 is horizontally moved a great many times between the corresponding positions of, for example, contacts 146 and 147. 169 is a cylindrical ring attached to the frame 168 of for example insulating material, on which the contacts 149 and 150 are located. 170 is a horizontal cylindrical insulating ring, on which the end contacts 146 and 147 are located.

According to this embodiment of the direction indicating device the horizontal and elevation angles to a located object can in known manner be determined from the positions of arm 145 and arm 142 respectively figured from the initial positions of the respective arms, whereby the position of one arm is independent of the position of the other arm. Other parts shown in this figure are similar to those shown in Fig. 2.

For the measurements of beat frequencies between a transmitted and a received reflected wave a wave analyser or only a frequency meter can be used.

The receiving element for the receipt of radio waves can consist of a dipole or of a resonator of, for example, cavity type located in the focus of a reflector behind the rotating screen with excentrically located hole.

The transmitting and receiving means can further be located in one place and the directing and indicating means can be located in another place. The directing and indicating means can thus be located in a bombproof room below ground, while the transmitter and the receiver with its reflectors can be located at a distance or high above the ground.

The directing and indicating means can be common for a plurality of transmitters and receivers located in a plurality of places, so that if a certain equipment is bombed, the search can be continued from another transmitter and receiver.

Having now particularly described and ascertained the nature of our said invention and in what manner the same is to be performed, we declare that what we claim is:

1. A system for locating and following an object in space comprising rotatable transmitting and receiving means pointing in substantially the same direction for the transmission and the reception of directed radio waves reflected from the object, driving means for rotating said transmitting and receiving means in at least one plane, impulse transmitting means coupled to said driving means for automatically turning said transmitting and receiving means in predetermined paths for searching said object in space, a current direction sensitive indicating device comprising a movable index and a scale for indicating departure of said index from its zero position, amplifying and distributing means coupled on one side to said receiving means and on the other side to said current direction sensitive indicating device for successively receiving and amplifying amounts of radio energy from two somewhat diverging directions in the same plane and corresponding to equal parts of the searching field and for transferring two successively received amounts of energy and delivering the resulting energy difference, if any, to said indicating device, manually operating electric means associated with said current direction sensitive indicating device and coupled to said driving means for turning said transmitting and receiving means in such a direction that the movable index of said current direction sensitive indicating device returns to or stays in zero position, in order to obtain a continuous indication of movement of an object in space corresponding to the instant position of the transmitting and receiving means, and a switching device coupled between said driving means on one side and said manually operable electric means and said impulse transmitting means on the other side for disconnecting said impulse transmitting means from said driving means at the moment, when reflected energy is received from an object in space by the receiving means, and for connecting said driving means to said manually operable means for the operation of said driving means in one or the other direction in accordance with the movement of said index in one or the other direction from its zero position.

2. The system as claimed in claim 1, in which the manually operating means comprises a potentiometer and a manually operable sliding contact, and the driving means comprises an electric motor and a current source, whereby the potentiometer, the current source, the sliding contact and the motor are so connected, that the speed of the motor can be varied in one or the other direction upon changing of the position of said contact in one or the other direction from its normal position.

3. The system as claimed in claim 1, in which the system comprises an object indicating device comprising a rotatable arm and synchronising means coupled to said impulse transmitting means and to said driving means for turning said arm synchronously with said driving means and said receiving means for indication of the direction of a located object by means of said arm.

4. The system as claimed in claim 1, in which the system comprises a contact arm turnable in a certain plane, a current source coupled to said driving means and said contact arm, a pole changing relay interconnected between said current source and said driving means for changing the direction of drive, and adjustable electrical end position contacts connected to said pole changing relay and positioned to make contact with said contact arm in any desired end position for operating said pole changing relays.

5. The system as claimed in claim 1, in which the system comprises an object indicating device comprising a rotatable contact arm provided with an incandescent lamp, a wave analyser interconnected between said lamp and the receiving means and arranged to deliver electric energy to said lamp for lighting same to a brilliancy proportional to a beat frequency formed between a transmitted wave and a received wave reflected from an object and according to the distance to the object, a current source coupled to said driving means and said contact arm, a pole changing relay interconnected between said current source and said driving means for changing the direction of drive, and adjustable electrical end position contacts connected to said pole changing relay and positioned to make contact with said contact arm in any desired end position for operating said pole changing relays.

6. The system as claimed in claim 1, in which the system comprises an object indicating device comprising a rotatable contact arm, a current source coupled to said driving means and said contact arm, a pole changing relay interconnected between said current source and said driving means for changing the direction of drive, adjustable electrical position contacts connected to said pole changing relay and positioned to make contact with said contact arm in any desired end position for operating said pole changing relay, synchronising means coupled to said impulse transmitting means and to said driving means for synchronously turning said arm with said driving means and said receiving means, an incandescent lamp attached to said arm for indicating the direction of a located object by means of the instant direction of said arm and said lamp, a wave analyser interconnected between said lamp and the receiving means and arranged to deliver electric energy to said lamp for lighting same to a brilliancy approximately proportional to a beat frequency formed between a transmitted wave and a received wave reflected from said object and thus proportional to the distance to the object.

7. The system as claimed in claim 1, in which the system comprises an object indicating device comprising a contact arm rotatable in any of two planes at right angles to each other, means to rotate said contact arm about a center, a current source coupled to said driving means and said contact arm, pole changing relays interconnected between said current source and said driving means for changing the direction of drives, adjustable end position contacts connected to said pole changing relays and current source for making contact with said contact arm, a transparent shell arranged about said center, said end position contacts movably attached to said shell and disposed to make contact with said contact arm, direction indicating visible means attached to said contact arm and connected to said receiving means for indicating direction of an object in space, when energy from said object is received by the receiving means.

HELGE FABIAN ROST.
KARL HARRY THUNELL.
STEN DANIEL VIGREN.
PER HARRY ELIAS CLAESSON.

REFERENCES CITED

The following references are of record in the file of this patent:

UNITED STATES PATENTS

| Number | Name | Date |
|---|---|---|
| 2,231,929 | Lyman | Feb. 18, 1941 |